Jan. 11, 1927.  E. S. COYLE  1,613,872
AUTOMATIC GATE
Filed April 21, 1925   2 Sheets-Sheet 1
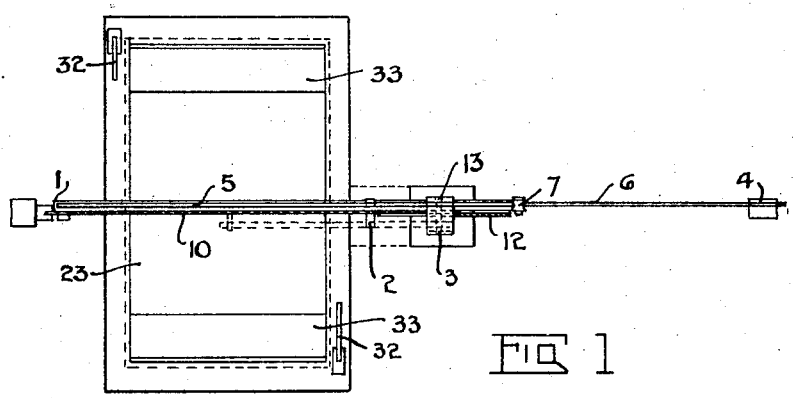
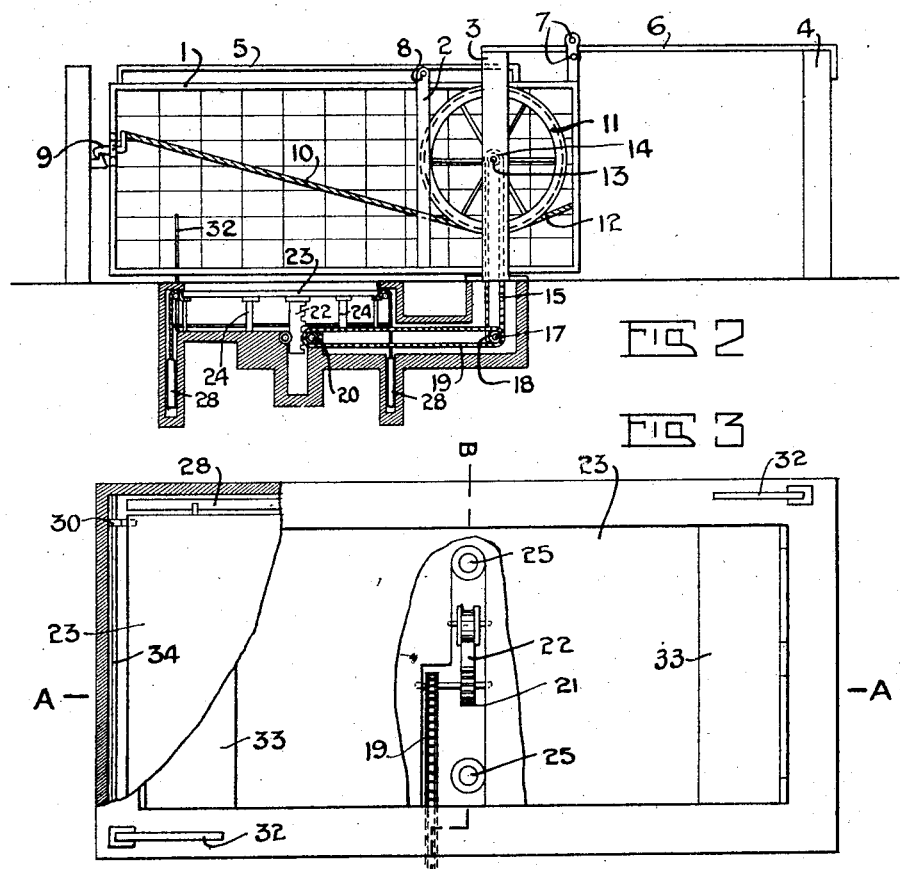
Witnesses:  Edward Sherman Coyle
Inventor Jan. 11, 1927. 1,613,872
E. S. COYLE
AUTOMATIC GATE
Filed April 21, 1925  2 Sheets-Sheet 2

Witnesses: Edward Sherman Coyle
Inventor

Patented Jan. 11, 1927.

1,613,872

UNITED STATES PATENT OFFICE.

EDWARD SHERMAN COYLE, OF NANTON, ALBERTA, CANADA.

AUTOMATIC GATE.

Application filed April 21, 1925. Serial No. 24,852.

My invention relates to a gate which is provided with a means for opening and closing, which operations are performed without touching the gate itself, the performance of the opening being done by the weight of the vehicle approaching the gate and the closing of the gate taking place automatically when the vehicle has passed through the opening, provision being also made for keeping the gate closed to animals intended to be kept within the enclosure to which the gate gives access.

These features and the manner of their accomplishment are illustrated in the accompanying drawings and described in the following specification.

Referring to the drawings—

Fig. 1 is a general plan showing the gate, the posts supporting the gate and also the approach platform;

Fig. 2 is an elevation of the gate and gate posts and shows in section the chain drive operated by the platform to open and close the gate;

Fig. 3 is an enlarged plan of the platform with fragments broken away to show how the movement of the platform is transmitted to the gate, and also shows the lock to prevent cattle opening the gate by walking on the platform;

Referring to the drawings in detail in which similar characters refer to similar parts:

Figure 4:
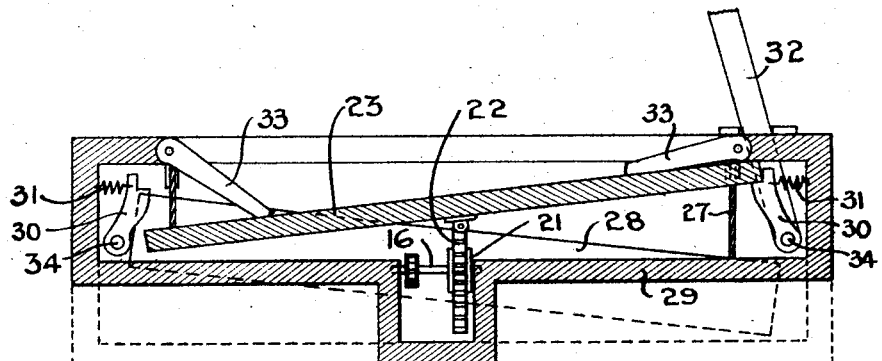
Fig. 4 is a section through the approach platform taken on the line A. A., in Fig. 3, showing in more detail the method of counter weights used for closing the gate and shows also the position assumed by the platform during opening the gate.
Figure 5:
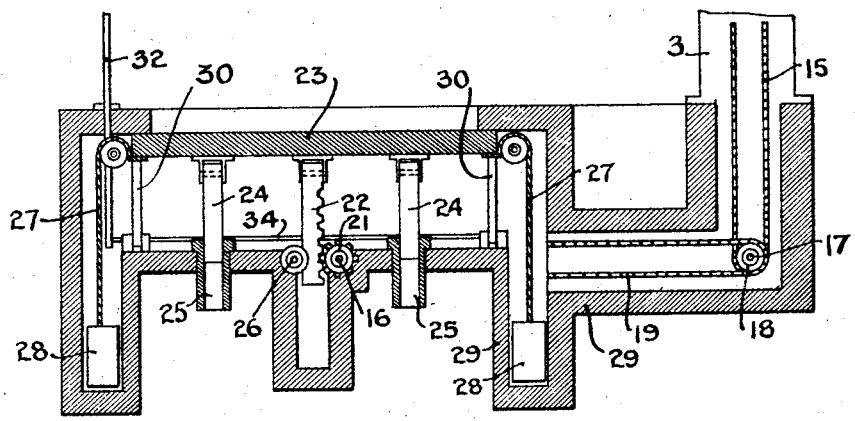
Fig. 5 is a section on the line B. B., showing the gear driven by the rack of the platform, the counter weights and also the means for retaining the platform in its proper position.
Figure 6:
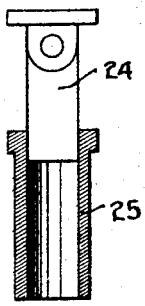
Fig. 6 is a detail of the guides used to retain the platform in proper relationship to the base casing.

My device consists of two essential parts, the gate and the opening and closing mechanism.

The gate 1 consists of a framing with fillers and is adapted to slide out of the way instead of swinging. To this end a post 2 is fixed near one end of the gate with a roller wheel 8 mounted in the top thereof, a rail 5 being mounted above the gate upon the under side of which the roller 8 engages. Two further posts are also provided to direct the travel of the gate, the post 3 being close to the post 2 and having the apparatus for moving the gate mounted thereon as hereinafter described, and a post 4 at the end of the travel. These two posts have their tops joined together by a rail 6, and to the end of the gate an arm is secured provided with rollers 7, to traverse the rail 6. A catch 9 is mounted upon the outer end of the gate 1, which catch has a cable 10 secured thereto, the cable 10 connecting the catch to a drum 11 and another cable 12 connects the drum 11 to the rear end of the gate 1.

The drum 11 is mounted on a stub shaft 13, which shaft is mounted in the post 3, and a sprocket wheel 14 is rigidly secured to the hub of the drum 11, for driving purposes.

The base of the post 3 is mounted upon a casing 29 in which casing the operating drive mechanism is enclosed, the said casing being secured within the ground in a location suitable to the approach of the gate. Within this casing adjacent the base of the post 3 is a shaft 17 on which two sprockets 18 are mounted together side by side. These sprockets are connected by a chain 15 to the drum sprocket 14 and a further chain 19 to a sprocket 20 mounted on a shaft 16, in the casing 29, immediately underneath the centre of the platform 23. On this shaft 16, a gear 21 is also mounted which is engaged by a rack 22. The rack 22 is pivoted to the underside of a platform 23, and is operated thereby.

The platform 23 occupies a space underneath the gate, extends on both sides thereof and receives the weight of the traffic. The toothed rack 22 pivoted upon the underside of the said platform is pressed downward by the traffic passing over the platform and transmits the power to open and close the gate, a guide roller 26 at the back of the rack serving to keep the rack 22 in mesh with the gear 21. To maintain the platform in position within the casing 29, spindles 24 are pivoted to the underside which spindles slide up and down in thimbles 25, formed in the casing 29.

Attached to the corners of the platform 23, are cables 27, to which counter-weights 28 are secured, and when the traffic has passed over the platform these counterweights return the platform to the raised position thereby closing the gate. To make the application of the traffic weight more gradual upon the platform, inclined members 33 are hinged to the casing 29, and extend towards the gate from each end of the platform, the free end of the said inclined members resting upon the platform. Dogs 30, are mounted upon a shaft 34, one set of dogs being mounted at each end of the platform and kept in contact with the underside of the platform when it is in the raised position by springs 31. The set of dogs at either end of the platform is released through a lever handle 32, which lever is secured upon the shaft 34, and projects above the surface of the casing 29. These dogs prevent cattle from opening the gate by walking upon the platform.

In operation the gate is normally closed and the platform inoperative through the dogs 30 being in the locked position. The driver of an approaching vehicle releases the dogs 30 by pulling the lever 32. This may be done either by dismounting or by driving near enough to the lever 32 to operate same without dismounting. The vehicle now drives upon the platform which is depressed by the weight of same, the rack 23 thereby operating the drum 11 through the connecting chain and gear system previously described. The drum 11 being revolved on its axle pulls upon the rope 10; releases the catch 9 and rolls the gate back upon its rollers to the open position. The vehicle having passed through the gateway the platform returns to its original position under the influence of the counterweights 28 thereby revolving the drum 11 in a reverse direction and closing the gate.

What I claim is:

1. An apparatus of the class described, comprising a gate mounted in slidable relation to gate posts, a drum mounted upon one of the said gate posts with cables connected therefrom to each end of the gate, an enclosed platform adapted to be depressed from each end separately by superimposed weight, means of returning the platform to its original position after it has been depressed comprising counterweights acting over pulleys, a rack mounted on the underside of the said platform, means of actuating the aforesaid drum mounted on the gatepost from the said rack comprising a gear and drive chain system.

2. An apparatus of the class described, comprising a gate mounted in slidable relation to gate posts, a shaft on one of said posts, a drum mounted upon said shaft, cables connecting said drum to each end of the gate, a chain sprocket mounted upon the shaft of the said drum, a casing, a shafting in said casing, a sprocket on said shafting, a chain trained over the sprockets, a casing underneath the gateway with a platform mounted therein adapted to be depressed from either end by the action of superimposed weight, a toothed rack pivoted to the underside of the said platform engaged with a pinion, means for communicating the motion of the platform to the shafting mounted in the casing consisting of sprockets and chains, counterweights attached to the said platform for returning it to its normal position, shafts at each end of the platform, dogs mounted on said last named shafts for engaging the underside of the platform, and lever means for releasing the said dogs from engagement with the said platform.

EDWARD SHERMAN COYLE.